(12) United States Patent
Klinger et al.

(10) Patent No.: US 9,340,084 B2
(45) Date of Patent: May 17, 2016

(54) DRIVE AXLE FOR AN INDUSTRIAL TRUCK

(71) Applicant: ZF Friedrichshafen AG, Friedrichshafen (DE)

(72) Inventors: Wolfgang Klinger, Passau (DE); Dirk Bald, Passau (DE); Christian Stammberger, Vilshofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/198,973

(22) Filed: Mar. 6, 2014

(65) Prior Publication Data

US 2014/0252738 A1 Sep. 11, 2014

(51) Int. Cl.
*B60G 9/04* (2006.01)
*B60B 35/00* (2006.01)
*B60B 35/16* (2006.01)

(52) U.S. Cl.
CPC .............. *B60G 9/04* (2013.01); *B60B 35/007* (2013.01); *B60B 35/16* (2013.01); *B60B 2900/133* (2013.01)

(58) Field of Classification Search
CPC ...... B60G 9/04; B60B 35/006; B60B 35/007; B60B 35/16; B60B 35/163; B60B 35/18
USPC ............. 280/86.5, 124.108, 124.109, 124.11, 280/124.177
See application file for complete search history.

(56) References Cited

U.S. PATENT DOCUMENTS

| | | | | |
|---|---|---|---|---|
| 1,801,522 A | * | 4/1931 | Monteith | 188/72.3 |
| 1,971,547 A | * | 8/1934 | White | 384/248 |
| 2,474,980 A | * | 7/1949 | Karl | 384/397 |
| 2,835,507 A | * | 5/1958 | Davies | 280/124.177 |
| 3,042,424 A | * | 7/1962 | Davis | 280/788 |
| 3,387,839 A | * | 6/1968 | Mundy et al. | 267/282 |
| 4,168,086 A | * | 9/1979 | Dick et al. | 280/124.1 |
| 4,377,216 A | * | 3/1983 | Ueno | 280/124.108 |
| 4,497,504 A | * | 2/1985 | Duff | 280/86.751 |
| 4,506,757 A | * | 3/1985 | Matsumoto et al. | 180/294 |
| 4,577,379 A | * | 3/1986 | Kramer | 29/898.055 |
| 4,663,810 A | * | 5/1987 | Kramer | 29/898.055 |
| 4,725,151 A | * | 2/1988 | Orndorff, Jr. | 384/98 |
| 4,773,771 A | * | 9/1988 | Kramer | 384/98 |
| RE32,774 E | * | 11/1988 | Duff | 280/86.751 |
| 4,927,275 A | * | 5/1990 | Lawson | 384/117 |
| 4,943,081 A | * | 7/1990 | Golpe | 280/124.109 |
| 5,328,159 A | * | 7/1994 | Kaufman et al. | 267/52 |
| 5,372,430 A | * | 12/1994 | Orndorff et al. | 384/98 |

(Continued)

FOREIGN PATENT DOCUMENTS

DE  10 2004 024 293 A1  12/2005
DE  10 2004 043 272 A1   3/2006

(Continued)

OTHER PUBLICATIONS

German Patent Office Search Report, Feb. 20, 2014.

*Primary Examiner* — Barry Gooden, Jr.
(74) *Attorney, Agent, or Firm* — Dority & Manning, P.A.

(57) ABSTRACT

A drive axle for industrial trucks is, by fastening mechanisms, on the one hand able to be connected to the vehicle frame and, on the other hand, connected to the axle housing. Flexible elements that take effect in the main directions of force in such a manner that they are mainly subject to pressure are arranged between the fastening mechanisms and the axle housing.

7 Claims, 8 Drawing Sheets

(56) References Cited

U.S. PATENT DOCUMENTS

| | | | |
|---|---|---|---|
| 5,460,234 A * | 10/1995 | Matsuura et al. | 180/65.1 |
| 5,732,441 A * | 3/1998 | Janian | 16/45 |
| 5,971,413 A * | 10/1999 | El-Kassouf | 280/124.111 |
| 6,109,630 A * | 8/2000 | Dazy et al. | 280/124.11 |
| 6,241,266 B1 * | 6/2001 | Smith et al. | 280/124.116 |
| 6,454,034 B1 | 9/2002 | Gotz | |
| 6,491,314 B2 * | 12/2002 | Smith et al. | 280/124.116 |
| 6,511,084 B1 * | 1/2003 | Buhl et al. | 280/124.107 |
| 6,644,910 B2 | 11/2003 | Gotz | |
| 6,959,935 B2 * | 11/2005 | Buhl et al. | 280/124.11 |
| 6,991,380 B2 * | 1/2006 | Wang et al. | 384/544 |
| 7,270,341 B2 * | 9/2007 | Longworth et al. | 280/124.11 |
| 7,874,394 B2 | 1/2011 | Cajan et al. | |
| 8,480,103 B2 * | 7/2013 | Kiselis et al. | 280/124.11 |
| 8,573,616 B2 * | 11/2013 | Iversen | 280/124.11 |
| 8,657,316 B1 * | 2/2014 | Bowers et al. | 280/124.156 |
| 8,708,594 B2 * | 4/2014 | Brunneke et al. | 403/131 |
| 8,801,012 B2 * | 8/2014 | Husson et al. | 280/124.11 |
| 2005/0063628 A1 * | 3/2005 | Wang et al. | 384/544 |
| 2006/0033298 A1 * | 2/2006 | Longworth et al. | 280/124.11 |
| 2009/0041570 A1 | 2/2009 | Gotz et al. | |
| 2009/0115153 A1 * | 5/2009 | Guhman | 280/124.11 |
| 2009/0178875 A1 * | 7/2009 | Bowers | 180/359 |
| 2011/0018217 A1 * | 1/2011 | Bramer et al. | 280/124.11 |
| 2011/0127746 A1 * | 6/2011 | Vogler et al. | 280/124.177 |

FOREIGN PATENT DOCUMENTS

| | | | |
|---|---|---|---|
| DE | 10 2007 002 522 A1 | 8/2007 | |
| DE | 102013203848 A1 * | 9/2014 | B60G 9/04 |

* cited by examiner

DRIVE AXLE FOR AN INDUSTRIAL TRUCK

FIELD OF THE INVENTION

The invention relates to a drive axle for an industrial truck, in particular a forklift, in which drive wheels are rotatably mounted and which is mounted to a vehicle frame by flexible elements.

BACKGROUND

Industrial trucks, in particular forklifts, have at least one drive axle, which often is arranged in the area of the hoisting gear, and is connected to the vehicle frame. In order to minimize bending and deformation of the vehicle frame, these axles are often connected to the frame by means of screw joints. This enables a positioning of the lift mast that is as accurate as possible.

The transfer of driving noise into the passenger compartment is a disadvantage of this type of connection.

DE 100 29 881 B4 discloses a forklift, at which the drive axle is rigidly connected to the lift frame, and the drive axle is connected to the frame through flexible elements, which are arranged in a ring pattern around the axle housing. The flexible elements thereby undergo shearing stress, which reduces the service life of the flexible elements.

SUMMARY OF THE INVENTION

This invention is subject to the task of creating a drive axle by means of which the transfer of noise into the driver's cabin is reduced, and which is characterized by high reliability. Additional objects and advantages of the invention will be set forth in part in the following description, or may be obvious from the description, or may be learned through practice of the invention.

The objects are solved with a drive axle of the generic kind that also has the distinctive characteristics according to aspects of the invention as set forth herein.

In accordance with the invention, the drive axle of the industrial truck has an axle housing, in which the drive wheels of the industrial truck are rotatably mounted. The drive axle is able to be connected to the vehicle frame through flexible elements, whereas the drive axle has fastening mechanisms that are, on one hand, able to be connected to the vehicle frame and, on the other hand, connected to the axle housing, whereas the flexible elements are arranged between these fastening mechanisms and the axle housing. The axle housing and fastening mechanisms are designed in such a manner that the flexible elements are subject to pressure solely in the main load directions. In one form of design of the invention, the fastening mechanisms are connected to the axle housing in such a manner that the flexible elements are installed under preload.

In an additional form of design of the invention, a flexible element is provided for each load direction; this is compressed in order to absorb the load forces.

Preferably, the flexible elements consist of a flexible plastic material. However, there is also the possibility of using other materials that are suitable for absorption. In addition to the absorption effect, the flexible material also has the necessary strength and stiffness for reliably transferring the forces at work to the drive and the vehicle.

In order to facilitate the mounting of the flexible elements and/or the fastening mechanisms on the axle housing, the flexible elements and/or the fastening mechanisms may have centering devices, by means of which easy mounting is possible.

By arranging the flexible elements directly between the axle housing and the fastening mechanisms, which are able to be connected to the vehicle frame, and by each flexible element absorbing only a main direction of force and thereby solely being subject to pressure, a drive axle for an industrial truck, which does not transfer unwanted vibrations to the vehicle cabin and can be operated reliably, is created.

BRIEF DESCRIPTION OF THE DRAWINGS

Additional characteristics can be taken from the description of the figures.

The following are shown.

DETAILED DESCRIPTION

Figure 1:
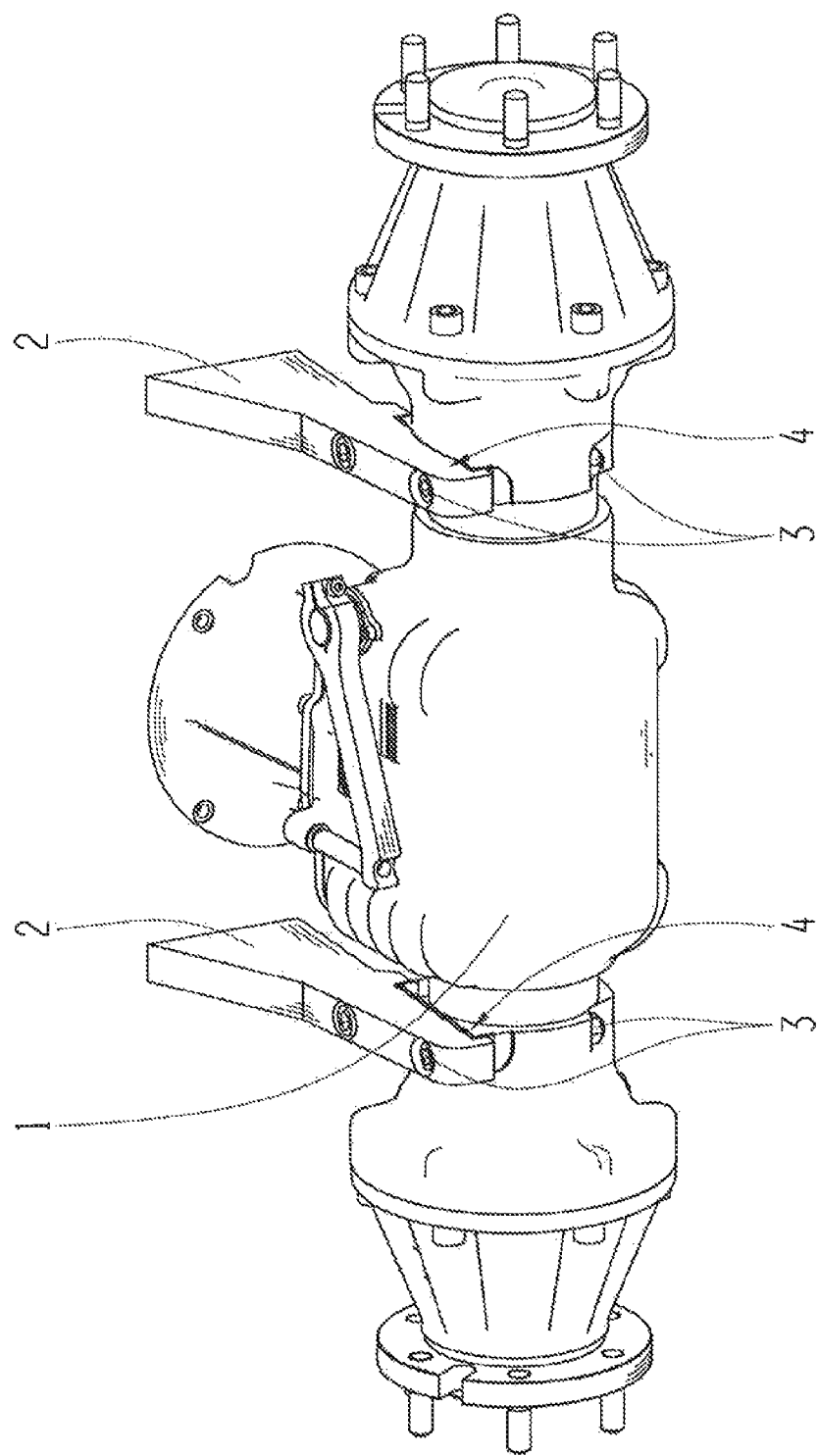
FIG. 1 is a drive axle.
Figure 2:
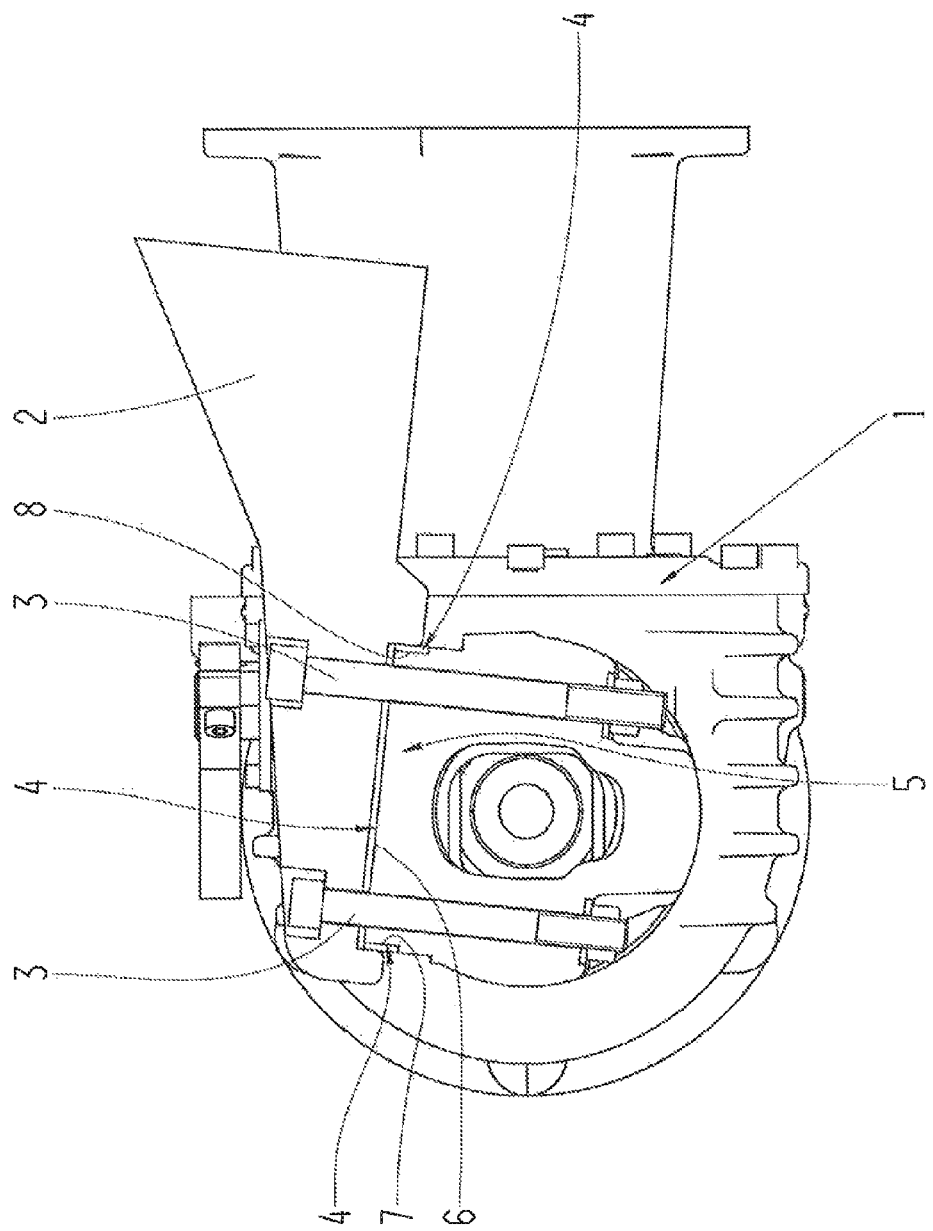
FIG. 2 is a cut through the drive axle of FIG. 1.
Figure 3:
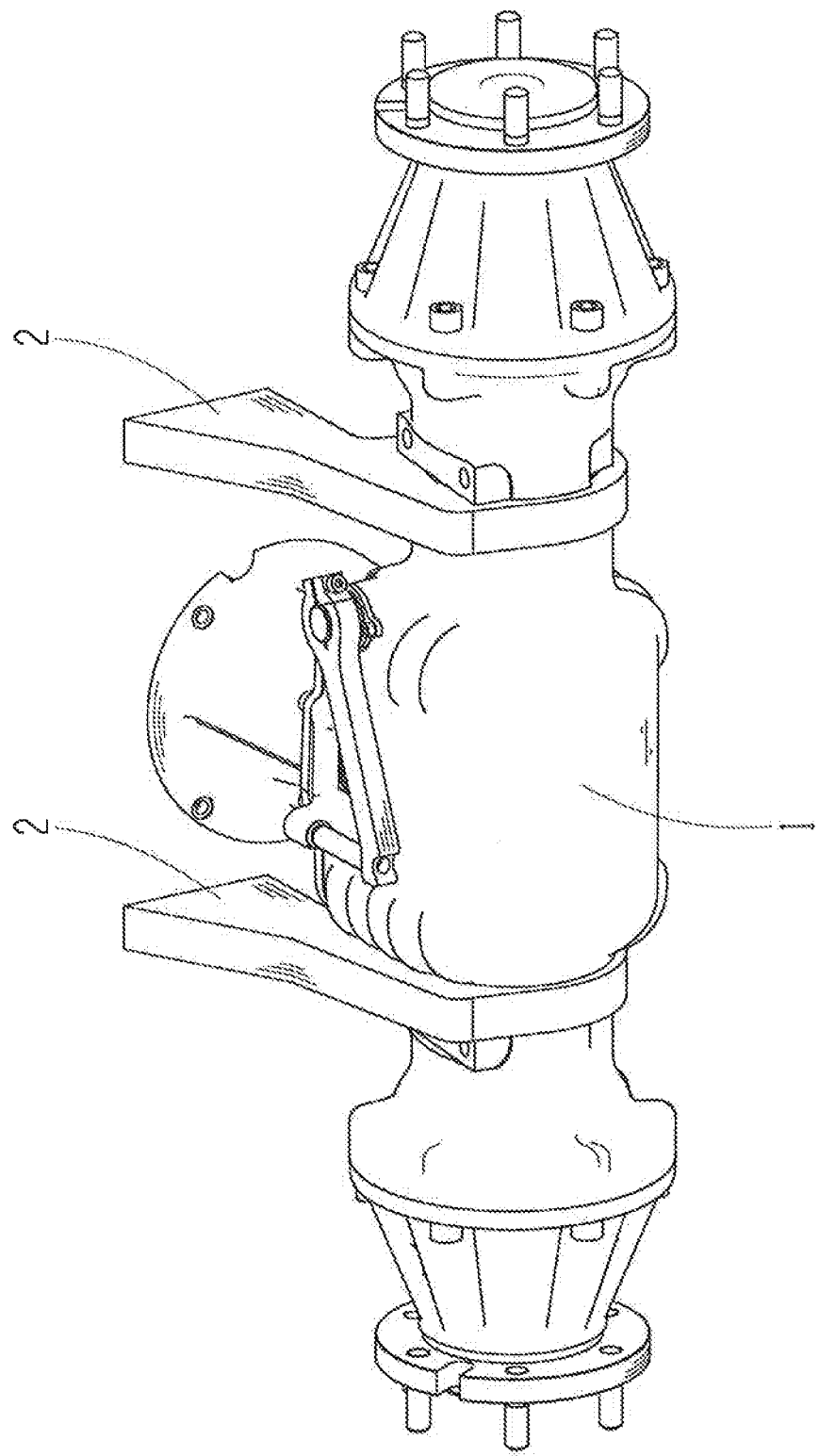
FIG. 3 is an additional option of a drive axle.
Figure 4:
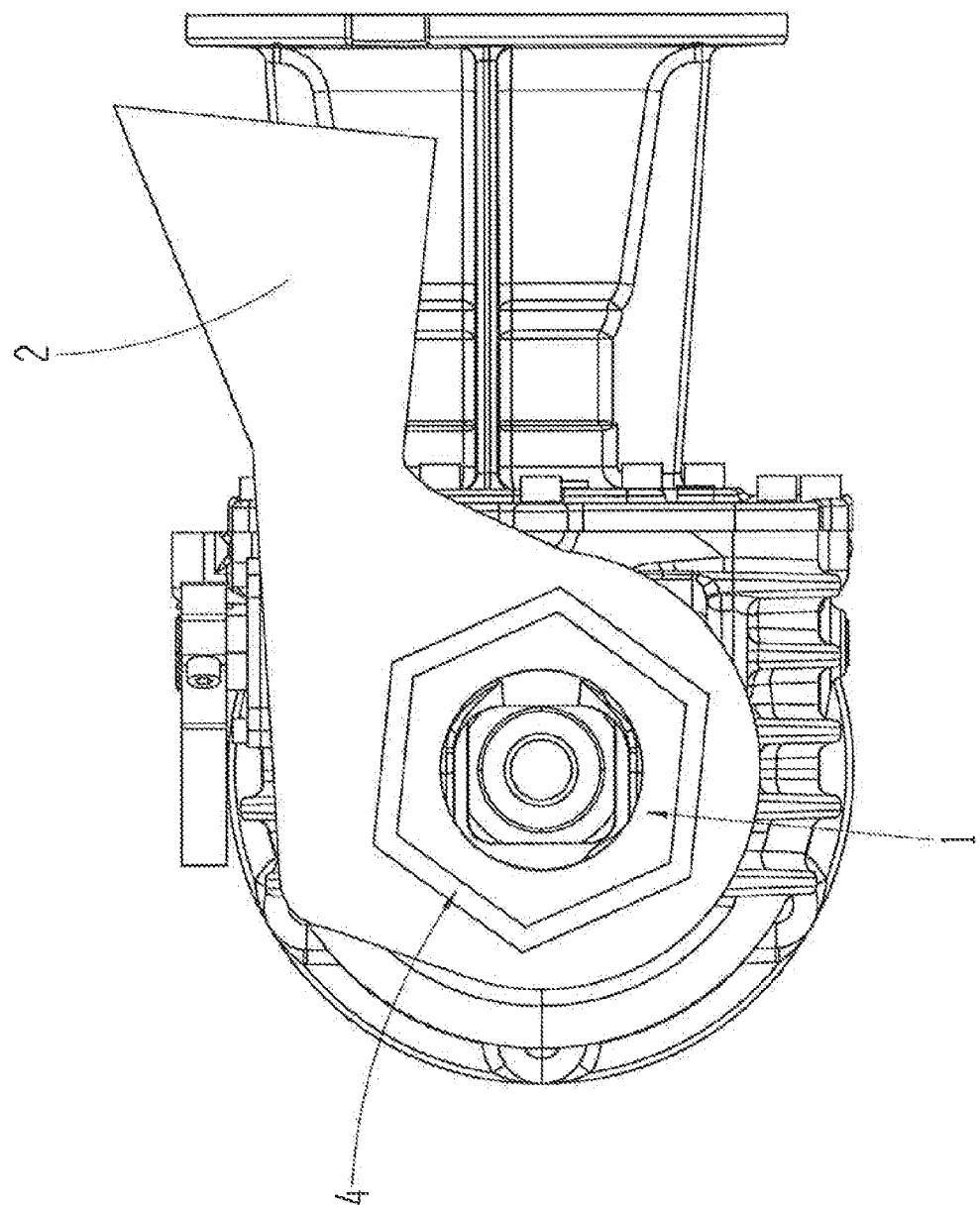
FIG. 4 is a cut through the drive axle according to FIG. 3.

Reference will now be made to embodiments of the invention, one or more examples of which are shown in the drawings. Each embodiment is provided by way of explanation of the invention, and not as a limitation of the invention. It is intended that the present invention include modifications and variations to the embodiments described herein.

FIG. 1:

The drive axle has an axle housing 1, to which fastening mechanisms 2 are connected, which, on the one hand, are able to be connected to a vehicle frame not shown here and, on the other hand, are connected to the axle housing 1 by screws 3. Flexible elements 4 are arranged between the fastening mechanisms 2 and the axle housing 1. Moreover, the lift mast not shown here may be rotatably mounted on the axle housing 1.

FIG. 2:

The fastening mechanisms 2 are connected to the axle housing 1 by screws 3. In the area of the fastening mechanisms 2, the axle housing 1 has a dome 5, which has a first contact surface 6 in a first direction of force, a second contact surface 7 in a second direction of force and a third contact surface 8 in a third direction of force. A flexible element 4 abuts the first contact surface 6, and is held under preload between the fastening mechanisms 2 and the axle housing 1 by screws 3. Thus, the flexible element 4 on the first contact surface 6 absorbs the forces from the load coming in perpendicular to the first contact surface 6. Thus, the flexible element 4 is solely subject to pressure. The flexible element 4, which abuts the second contact surface 7, absorbs forces from the second direction of force upon a pressure load that takes effect perpendicular to the second contact surface 7, and the flexible element 4, which abuts the third contact surface 8, absorbs forces that take effect perpendicular to the third contact surface 8, in the 3rd dimension not shown here. Thus, all flexible elements 4 are subject to pressure and cover the main directions of force.

FIG. 3:

The fastening mechanisms 2 are connected to the axle housing 1, whereas flexible elements that are not shown are arranged between the fastening mechanism 2 and the axle housing 1. The fastening mechanisms 2 fully encompass the axle housing 1.

FIG. 4:

The axle housing 1 is designed as a hexagon in the area of the fastening mechanisms 2. However, there is also the possibility of using a different polygon, such as a triangle or an octagon. A flexible element 4 is set up at each surface of the hexagon of the axle housing 1, by which, upon a load of the fastening mechanism 2, mainly compressive stress takes effect on the flexible elements 4.

FIG. 5:

The fastening mechanisms 2 are connected to the axle housing 1, whereas the axle housing 1 has a v-shaped groove 9, in which flexible elements 4 are arranged. The v-shaped groove 9 is found around the axle housing 1. The v-shaped groove 9 may be designed in a plane or curved form, and may run at right angles along the longitudinal extension of the drive axle.

Figure 5:
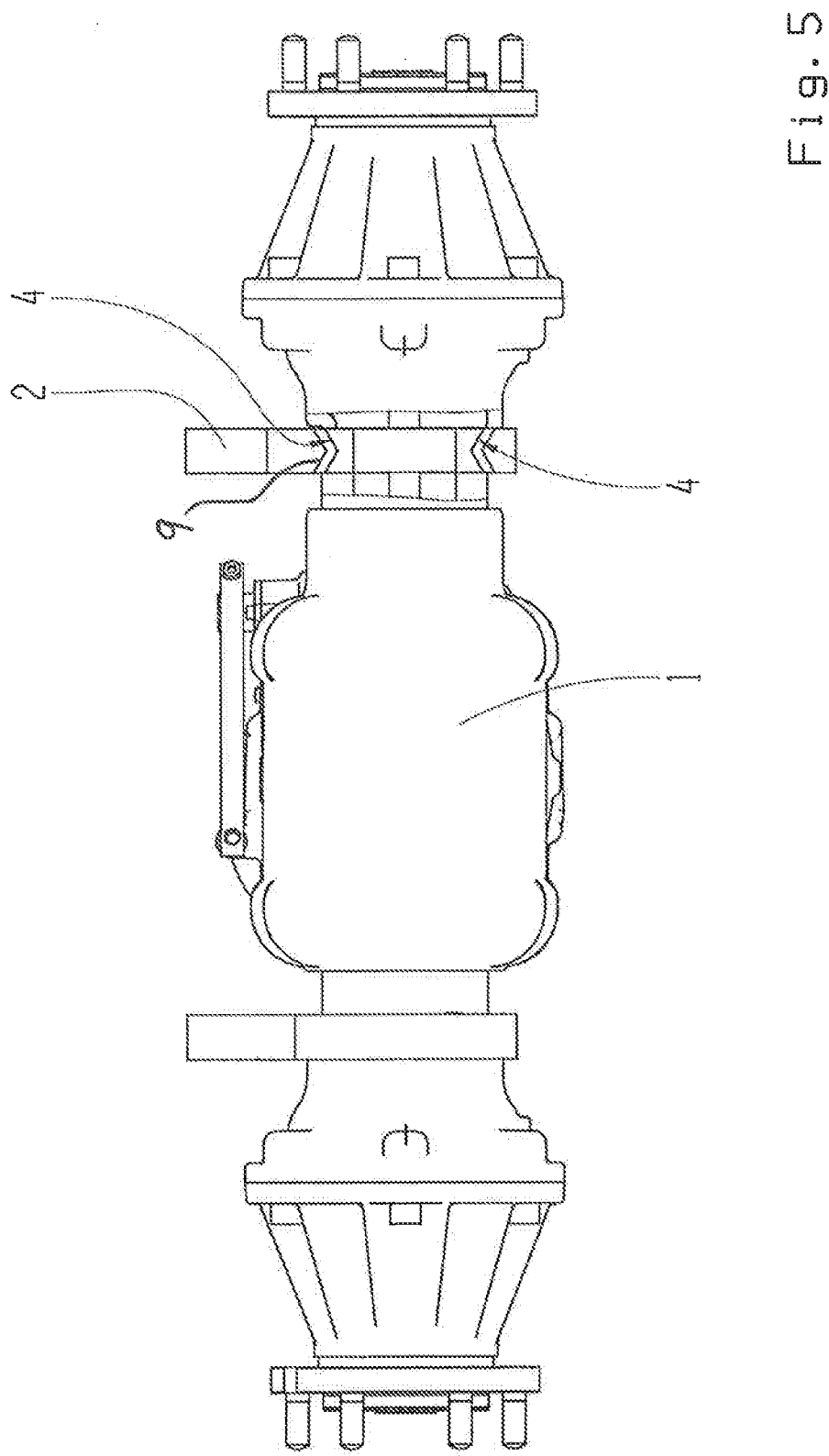
FIG. 5 is a drive axle with v-shaped grooves.
Figure 6:
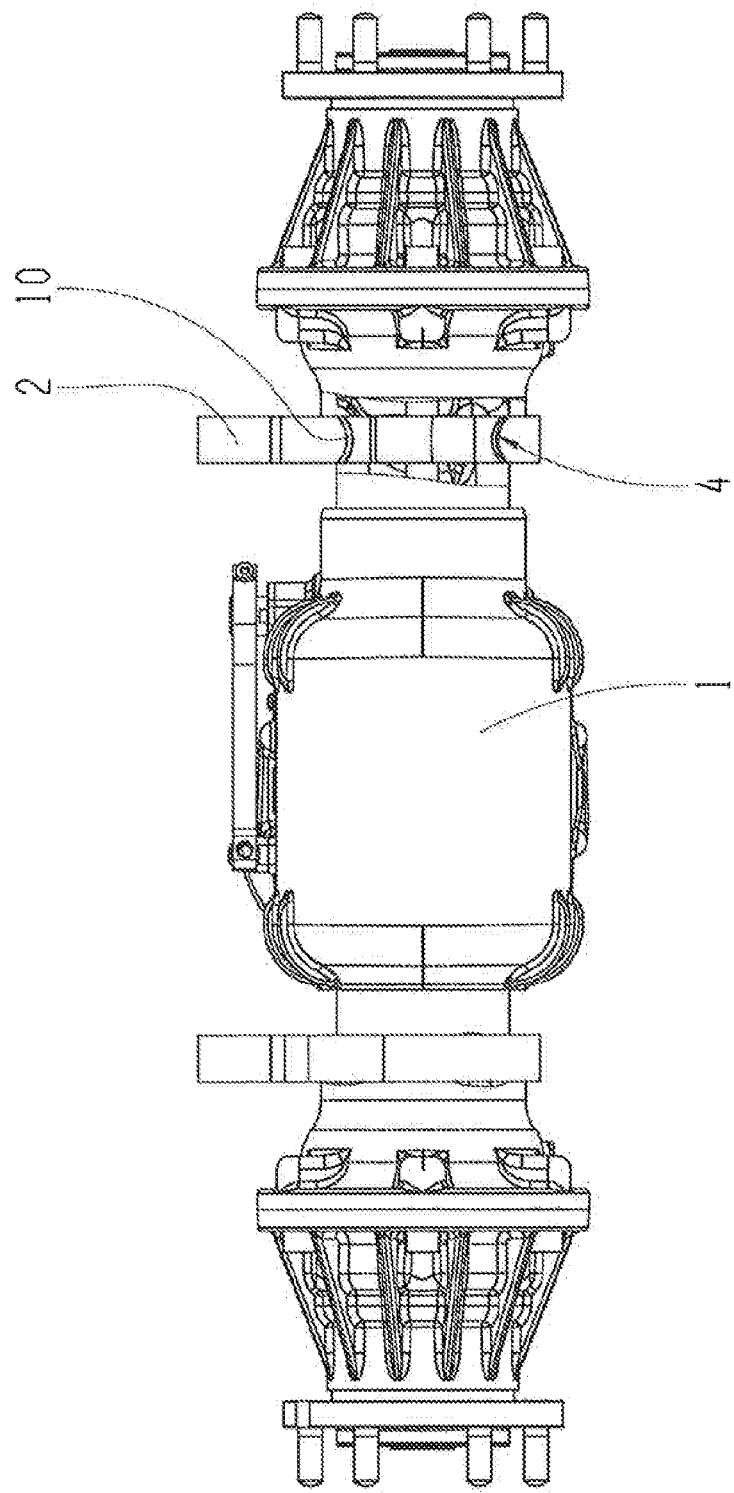
FIG. 6 is a drive axle with u-shaped grooves.
Figure 7:
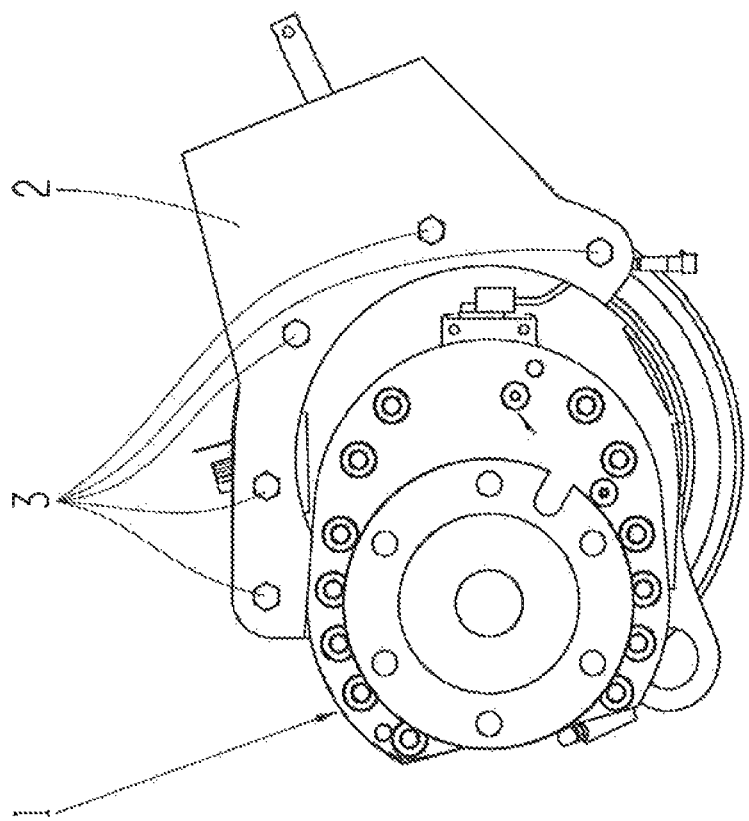
FIG. 7 is a side view of a drive axle.
Figure 8:
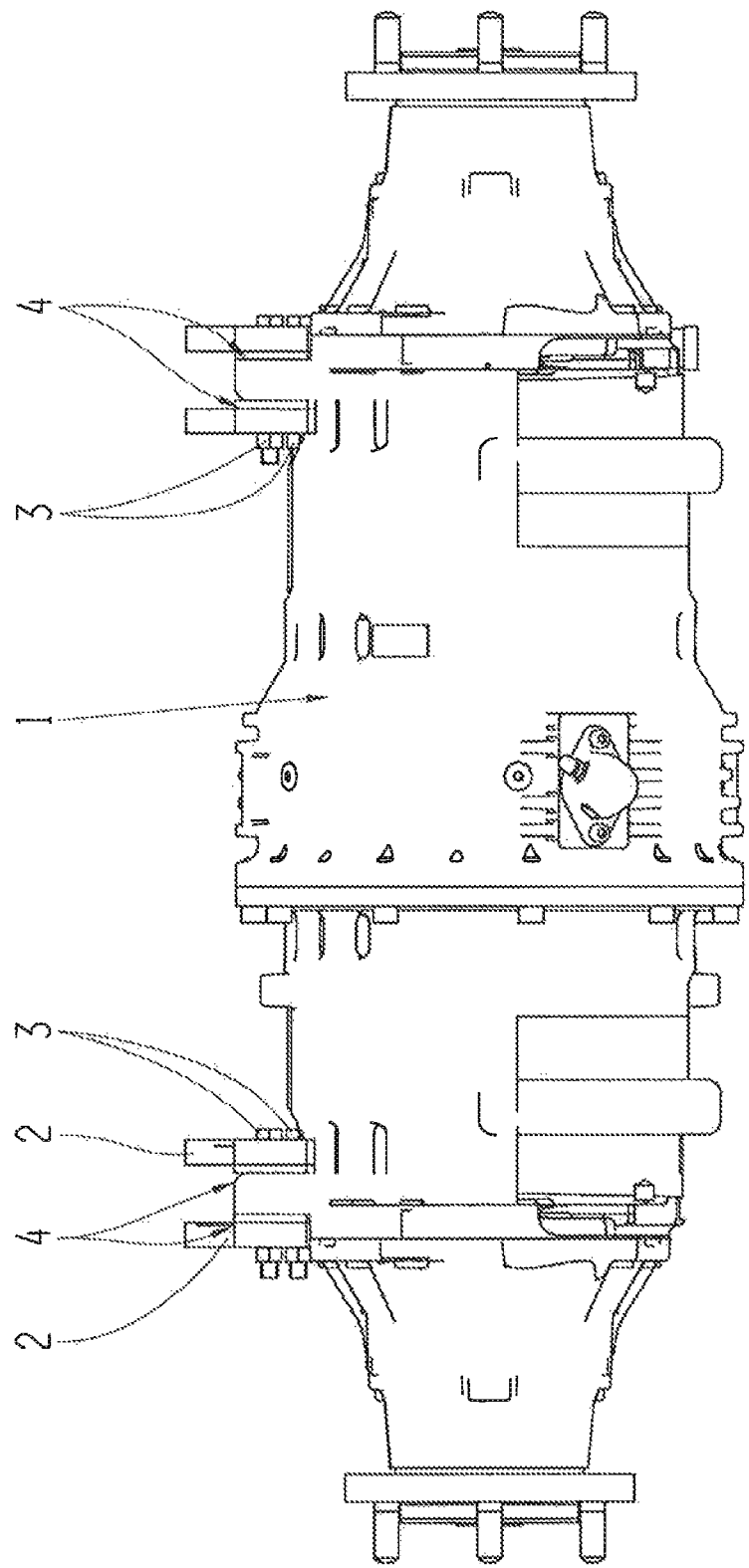
FIG. 8 is a front view of the drive axle of FIG. 7.

FIG. 6:

The drive axle according to FIG. 6 differs from the drive axle according to FIG. 5 by the fact that the v-shaped grooves 9 of FIG. 5 are replaced by u-shaped grooves 10 of FIG. 6.

FIG. 7:

The drive axle has an axle housing 1, to which fastening mechanisms 2 are connected, which, on the one hand, are able to be connected to a vehicle frame not shown here and, on the other hand, are connected to the axle housing 1 by screws 3. Flexible elements 4 that are formed flat are arranged between the fastening mechanisms 2 and the axle housing 1.

As a variant, the lift mast that is not shown here may be rotatably mounted on the axle housing 1.

Modifications and variations can be made to the embodiments illustrated or described herein without departing from the scope and spirit of the invention as set forth in the appended claims.

The invention claimed is:

1. A drive axle for a motor vehicle, comprising:
   an axle housing;
   fastening mechanisms connected to the axle housing, the fastening mechanisms used to connect the axle housing to a frame of the motor vehicle, wherein at least a partial polygon mating surface profile is defined between the axle housing and each of the fastening mechanisms, the mating surface profile having a plurality of sides extending perpendicular to a longitudinal axis of the drive axle, with the sides intersecting at non-zero angles;
   an individual and separate flexible element disposed between the fastening mechanisms and the axle housing along each of the sides so as to decouple direct contact between the fastening mechanisms and the axle housing, the flexible elements separated and abutting at the intersections of the sides; and
   the flexible elements separated and disposed so as to be subjected to mainly compressive pressure forces induced in a load direction perpendicular to the respective side along which the flexible element is disposed as opposed to shearing forces.

2. The drive axle as in claim 1, wherein the fastening mechanisms and the mating surface profile partially enclose the axle housing in a positive-locking manner.

3. The drive axle as in claim 1, wherein the mating surface profile has a polygon shape that completely encircles the axle housing, the flexible element arranged on each surface of the polygon shape.

4. The drive axle as in claim 1, wherein the fastening mechanisms comprise a V-shaped groove perpendicular to a longitudinal axis of the drive axle, the flexible element arranged on each angled surface of the V-shaped groove.

5. The drive axle as in claim 1, wherein the fastening mechanisms comprise a U-shaped groove perpendicular to a longitudinal axis of the drive axle, the flexible element arranged on the surface of the U-Shaped groove.

6. The drive axle as in claim 1, wherein the fastening mechanisms comprise a dome arranged perpendicular to a longitudinal axis of the drive axle and the mating surface profile defines three separate contact surfaces with the axle housing, the flexible element arranged on each of the three contact surfaces.

7. The drive axle as in claim 1, wherein the fastening mechanisms are fastened to the axle housing with screws that extend into holes in the axle housing.

\* \* \* \* \*